E. MACNEIR.
WATER GAUGE.
APPLICATION FILED JAN. 20, 1920.
1,408,818.
Patented Mar. 7, 1922.
2 SHEETS—SHEET 2.
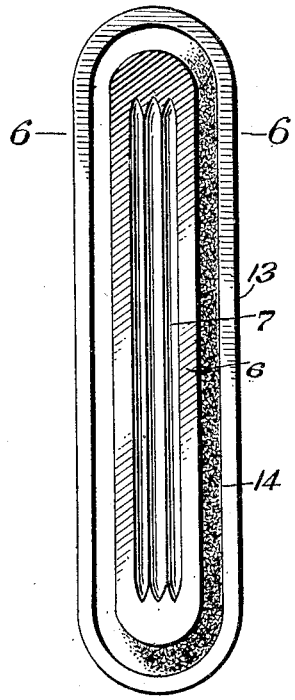
Fig. 4.
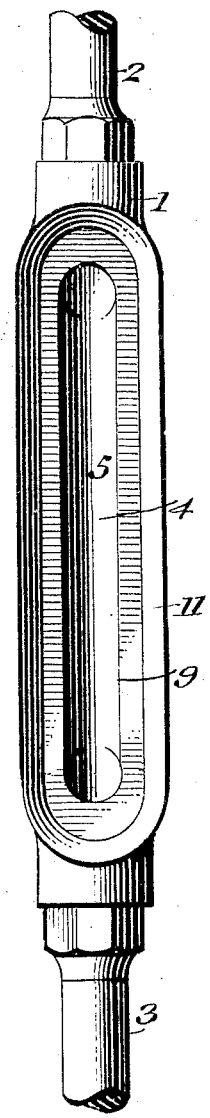
Fig. 5.
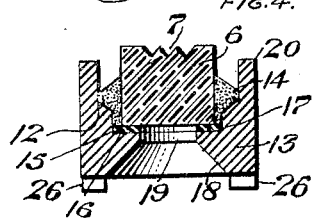
Fig. 6.
ON LINE 6-6.
FIG. 4.
INVENTOR.
Edwin Macneir,
BY
Thedersheim Fairbanks
ATTORNEYS

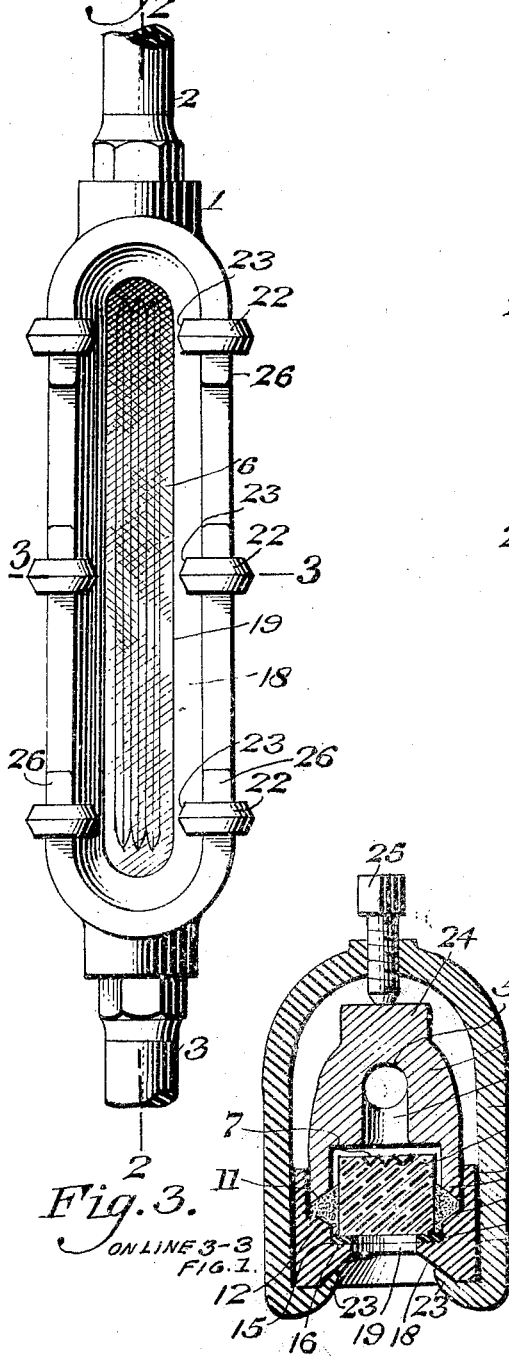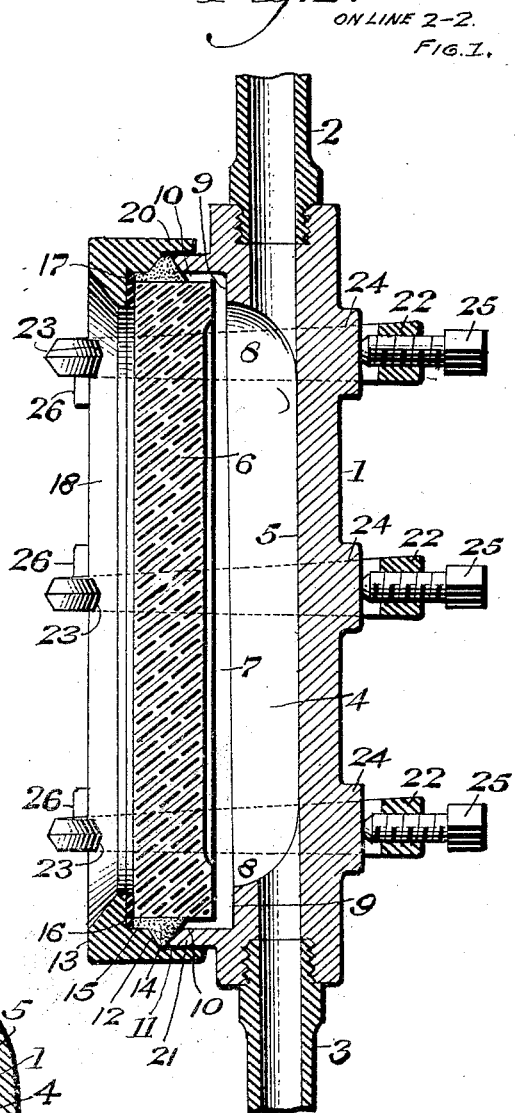

UNITED STATES PATENT OFFICE.

EDWIN MACNEIR, OF PHILADELPHIA, PENNSYLVANIA, ASSIGNOR TO EDNA BRASS MANUFACTURING COMPANY, OF CINCINNATI, OHIO, A CORPORATION OF OHIO.

WATER GAUGE.

1,408,818.  Specification of Letters Patent.  Patented Mar. 7, 1922.

Application filed January 20, 1920. Serial No. 352,720.

*To all whom it may concern:*

Be it known that I, EDWIN MACNEIR, a citizen of the United States, residing in the city and county of Philadelphia, State of Pennsylvania, have invented a new and useful Water Gauge, of which the following is a specification.

My present invention comprehends a novel construction of a water gauge wherein is employed a novel construction of a frame or body portion and a novel construction of sight member whereby the gasket or packing which contributes to retain the glass in position is moved laterally towards the glass when the parts are assembled.

It further comprehends a novel construction of a sight member having a glass sealed therein so that in case a glass becomes broken or injured it is simply necessary to take a sight member with the glass sealed therein from the stock room and use it in lieu of the sight member and glass in which the glass has become injured. By such construction new glass can be secured in position in a minimum of time.

Other novel features of construction and advantage will hereinafter appear in the detailed description of the invention.

For the purpose of illustrating my invention, I have shown in the accompanying drawings a typical embodiment which is at present preferred by me, since said embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents, in front elevation, a water gauge embodying my invention.

Figure 2 represents a section on line 2—2 of Figure 1.

Figure 3 represents a section on line 3—3 of Figure 1.

Figure 4 represents, in rear elevation, a sight member with the glass sealed therein.

Figure 5 represents, in front elevation, a body portion or frame of the gauge with the slight member and glass removed.

Figure 6 represents a section on line 6—6 of Figure 4.

Similar numerals of reference indicate corresponding parts.

Referring to the drawings, 1 designates the casing or body portion of the gauge in threaded engagement with which is an upper nipple 2 and a lower nipple 3 by means of which the water gauge is secured in position in the usual manner, it being apparent that these nipples are adapted to receive the usual type of fitting. The nipples 2 and 3 communicate with the chamber 4 of the casing. The rear wall 5 of the chamber 4 forms a background for the glass 6 which is provided on its rear face with the reflexes 7. The rear wall 5 of the chamber 4 at its upper and lower end curves outwardly as indicated at 8 and merges into a vertical wall 9 which latter merges into a laterally extending wall 10 which terminates in an inwardly inclined wall 11 which forms the front wall of the casing so that it forms with the inner wall 12 of the sight member 13 inwardly diverging walls between which is positioned a wedge-shaped packing or gasket 14. The wall 12 of the sight member merges into a laterally extending wall 15 which terminates in an inwardly extending wall 16 against which is preferably placed a gasket 17 which may be formed in any desired manner. The front wall of the sight member 13 converges inwardly as indicated at 18 to the sight opening 19. The sight member 13 is provided with an inwardly extending flange 20 which overhangs the outwardly extending flange 21 of the casing or body portion 1.

Any desired means may be employed to secure the sight member in assembled position with respect to the body portion of the gauge and in order to illustrate one manner of doing this, I employ one or more yokes 22, the free ends of which are deflected laterally and inwardly as indicated at 23, see Figure 3, in order to conform to the contour of the front portion of the sight member with which they co-operate.

The casing is provided on its rear face with one or more bosses 24 against which contact the adjusting screws 25 which are in threaded engagement with the yoke and abut against the enlargements or bosses 24 of the body portion. The rear face of the glass 6 and a portion of the lateral walls are surrounded by the steam and water so that the glass is steam packed thereby reducing to a minimum the liability of the particles of the glass to fly outwardly in case the glass should for any reason become broken.

In Figures 4 and 6, I have shown the sight member, the glass and the packing in the manner in which they are employed as an article of manufacture and as forming a concrete unitary structure, which is bodily assembled with respect to the body portion of the gauge.

It will be seen that the wedge-shaped packing is retained between the juxtaposed inclined faces of the body portion so that when the screws 25 are tightened the packing 14 will be moved laterally toward the glass and the glass is securely held in position by the inward movement of the gasket 14 and is at all times out of contact with the body portion or frame of the gauge and also the sight member.

The gasket 17 is preferably employed to serve as a heat resisting material between the glass and the sight member, although it can be dispensed with if desired as the glass is held in position by the lateral movement of the gasket 14.

In a co-pending application Serial No. 57,280, filed Oct. 22nd, 1915, I have described and broadly claimed a novel construction of a water gauge wherein the glass is held in position by means of a gasket which is moved laterally toward the glass when the sight member and gauge body portion are assembled.

In accordance with my present invention, the glass is sealed in the sight member before it is assembled and I employ a flange which overhangs the body portion and this flange serves as a guide for the relative movement of the sight member and body portion when the parts are being assembled or taken apart.

If desired the sight member may be provided on its front face with lugs 26 which serve as stops to position the yokes. These lugs are not essential and may be dispensed with.

It will be apparent from the foregoing that in accordance with my present invention, the glass is steam or pressure packed as it is surrounded on its rear face and its lateral walls by the fluid being registered. When the parts are clamped in assembled position the packing moves laterally against the lateral walls of the glass so that the glass is retained in position by the lateral pressure of the gasket, is partially surrounded by the fluid being registered and is at all times out of contact with both the casing and the sight member.

On this account the glass does not have any contact with any metallic portion of the gauge, the result of which is that it is less likely to become cracked or broken owing to the different co-efficients of expansion and contraction of the glass and of the metal parts of the gauge.

Gauges of this type are generally employed on locomotives and in practice there is considerable delay in the ordinary types of gauges in repairing a gauge in case it becomes broken and in many cases it is necessary to send the locomotive to the round house for repairs. It will be seen that in accordance with my present invention all that it is necessary to do in case a glass becomes broken, is to remove the sight member with the broken glass and to replace it with another sight member. The glass is packed in the sight member so that a minimum amount of time is necessary to effect the replacement of the glass, and it is not necessary to return the locomotive to the round house.

It will be seen that in accordance with my present invention, the packing is provided with a forward extension, so that when the parts are clamped together, the gasket will move laterally towards the glass, and there will not be any tendency of the packing to pass beneath the base of the glass to force the latter rearwardly.

The wall 15 contributes with the glass to form a chamber or reservoir to receive the packing when it is compressed to seal the glass and the packing does not necessarily have to fill such chamber or reservoir.

It will now be apparent that I have devised a novel and useful construction of a water gauge which embodies the features of advantage enumerated as desirable in the statement of the invention and the above description, and while I have, in the present instance, shown a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new, and desire to secure by Letters Patent, is:—

1. A water gauge, comprising a casing, a sight member, said casing and sight member having juxtaposed inclined faces, and the sight member having a flange overlapping the casing, a packing between the inclined faces of the sight member and the casing, a glass having its rear face and a portion of its lateral faces exposed to the fluid being registered, and means to secure the sight member and casing together to cause the sight member to move towards the casing to cause the packing to move inwardly towards the glass between the said inclined faces to engage the lateral walls thereof and serve as the dominant factor in securing the glass in position.

2. A water gauge, comprising a casing having a chamber opening through the side thereof, a sight member for said casing, said casing and sight member having overlapped portions, a glass enclosed between said sight member and casing, sealing means between said sight member and casing adapted to engage only the lateral walls of the glass, the entire rear wall and a portion of the lateral walls of said glass being at all times exposed to the water, and means to effect relative movement of said sight member and casing to cause the sealing means to engage the glass and effect a seal between the sight member and the casing.

3. A water gauge, comprising a casing provided with means to secure it in position, a sight member for said casing, the casing and sight member having opposed walls diverging inwardly and provided with overlapping flanges, a glass within said casing and out of contact with the walls of the sight member and the casing, a wedge-shaped packing between said diverging walls of the sight member and casing and engaging only the lateral walls of the glass, and means to clamp the parts in assembled position, to cause the packing to move laterally towards the lateral walls of the glass.

EDWIN MACNEIR.

Witnesses:
H. S. FAIRBANKS,
C. D. McVAY.